(12) United States Patent
Domenech et al.

(10) Patent No.: US 11,247,743 B2
(45) Date of Patent: Feb. 15, 2022

(54) MOTORCYCLE WITH PIVOTABLE FUEL TANK

(71) Applicant: KTM AG, Mattighofen (AT)

(72) Inventors: Juan Domenech, Henndorf am Wallersee (AT); Luca Francesco Contardo, Seekirchen am Wallersee (AT)

(73) Assignee: KTM AG, Mattighofen (AT)

( * ) Notice: Subject to any disclaimer, the term of this patent is extended or adjusted under 35 U.S.C. 154(b) by 114 days.

(21) Appl. No.: 16/718,756

(22) Filed: Dec. 18, 2019

(65) Prior Publication Data

US 2020/0198717 A1    Jun. 25, 2020

(30) Foreign Application Priority Data

Dec. 19, 2018    (AT) .............................. A 51130/2018

(51) Int. Cl.
*B62J 35/00* (2006.01)
*B60K 15/01* (2006.01)

(52) U.S. Cl.
CPC ............. *B62J 35/00* (2013.01); *B60K 15/013* (2013.01)

(58) Field of Classification Search
CPC ......... B62J 35/00; B62J 37/00; B60K 15/013; B60K 15/01; B62K 11/00
See application file for complete search history.

(56) References Cited

U.S. PATENT DOCUMENTS

| | | | | |
|---|---|---|---|---|
| 4,347,909 A | * | 9/1982 | Takemura | B62J 35/00 180/219 |
| 4,469,190 A | | 9/1984 | Yamaguchi | |
| 4,509,613 A | * | 4/1985 | Yamaguchi | B62J 35/00 180/219 |
| 6,641,169 B2 | | 11/2003 | Fukunaga et al. | |
| 8,113,312 B2 | * | 2/2012 | Seki | B62J 35/00 180/225 |
| 8,146,693 B2 | * | 4/2012 | Oohashi | B60K 13/02 180/68.3 |
| 8,256,557 B2 | | 9/2012 | Suzuki | |
| 8,418,794 B2 | | 4/2013 | Shibata et al. | |
| 8,439,146 B2 | * | 5/2013 | Tanaka | B62J 37/00 180/219 |
| 8,448,734 B2 | * | 5/2013 | Maeda | B62J 37/00 180/69.4 |
| 8,662,518 B2 | | 3/2014 | Koike | |

(Continued)

FOREIGN PATENT DOCUMENTS

| | | |
|---|---|---|
| CN | 201306227 | 9/2009 |
| CN | 201344075 | 11/2009 |

(Continued)

*Primary Examiner* — Jacob D Knutson
*Assistant Examiner* — Michael R Stabley
(74) *Attorney, Agent, or Firm* — Wenderoth, Lind & Ponack, L.L.P.

(57) ABSTRACT

A motorcycle includes an internal combustion engine, a frame, a fuel tank for carrying a fuel to be consumed by the internal combustion engine, and a container connected to the internal combustion engine and the fuel tank. The container is configured to store fuel evaporating from the fuel tank, and the container in a position of use is at least partially covered by the fuel tank. The fuel tank is supported pivotably relative to the frame between a maintenance position and the position of use.

22 Claims, 6 Drawing Sheets

(56) References Cited

U.S. PATENT DOCUMENTS

| | | | |
|---|---|---|---|
| 8,844,666 B2* | 9/2014 | Ashida | B62J 37/00 |
| | | | 180/219 |
| 8,857,556 B2* | 10/2014 | Nishimura | B62K 19/46 |
| | | | 180/291 |
| 9,278,615 B2 | 3/2016 | Nishida et al. | |
| 10,131,396 B2 | 11/2018 | Yasuta et al. | |
| 10,473,070 B2 | 11/2019 | Kamikozawa | |
| 10,988,201 B2* | 4/2021 | Sakaguchi | B62K 11/04 |
| 2003/0075659 A1 | 4/2003 | Fukunaga et al. | |
| 2009/0322069 A1 | 12/2009 | Koike | |
| 2010/0243358 A1 | 9/2010 | Suzuki | |
| 2011/0024214 A1 | 2/2011 | Seki et al. | |
| 2011/0100742 A1 | 5/2011 | Shibata et al. | |
| 2014/0060955 A1* | 3/2014 | Kono | F02M 25/0854 |
| | | | 180/291 |
| 2014/0290769 A1 | 10/2014 | Nishida et al. | |
| 2016/0229476 A1 | 8/2016 | Yasuta et al. | |
| 2018/0179992 A1* | 6/2018 | Morita | B62J 35/00 |
| 2018/0180001 A1 | 6/2018 | Kamikozawa | |
| 2020/0140030 A1* | 5/2020 | Ishii | F02M 25/0854 |

FOREIGN PATENT DOCUMENTS

| | | | | |
|---|---|---|---|---|
| DE | 32 49 623 | | 4/1983 | |
| DE | 3234541 | | 4/1983 | |
| DE | 10 2015 110 378 | | 2/2016 | |
| DE | 11 2013 007 471 | | 6/2016 | |
| DE | 102017219422 | | 5/2018 | |
| DE | 10 2017 129 557 | | 8/2018 | |
| EP | 2 236 402 | | 10/2010 | |
| EP | 2 258 938 | | 12/2010 | |
| EP | 2 279 936 | | 2/2011 | |
| EP | 2 141 067 | | 10/2013 | |
| EP | 1 609 709 | | 3/2014 | |
| JP | 2018-71491 | | 5/2018 | |
| JP | 2018-79703 | | 5/2018 | |
| JP | 2018079703 A | * | 5/2018 | F02M 35/042 |

* cited by examiner

MOTORCYCLE WITH PIVOTABLE FUEL TANK

BACKGROUND OF THE INVENTION

The invention concerns a motorcycle including an internal combustion engine, a frame, a fuel tank for carrying a fuel to be consumed by the internal combustion engine, and a container which is connected to the internal combustion engine and the fuel tank. The container is adapted to store fuel evaporating from the fuel tank, and the container in a position of use is at least partially covered by the fuel tank.

With motorcycles with internal combustion engines the problem arises that fuel carried in the fuel tank evaporates, in which case a discharge is required for the evaporated fuel to avoid the fuel tank being ruined.

Understandably, the emission of hydrocarbons into the environment is to be minimized to the maximum possible degree for reasons of environmental protection. Many countries therefore have a statutory requirement for devices with which the emission of evaporated fuel into the environment is suppressed to the maximum possible degree (evaporative emission control system). Usually these involve devices with which evaporated fuel escaping from the fuel tank can be stored and then returned to the engine again. For that purpose those devices are frequently in the form of a container in which there is arranged an activated carbon filter by which evaporated fuel can be trapped and held in intermediate storage.

Because of the large number of devices and apparatuses which are fitted in modern motorcycles the available space for those containers is usually tight, in which respect motorcycles inherently have much less available space than private automobiles. Added to that is the fact that by virtue of thermal demands only certain regions are to be considered as appropriate for arranging that container. More specifically a level of absorption which is as high as possible occurs in respect of activated carbon filters under cool conditions. For that reason the container for example should not be exposed to direct sunlight. In operation of the motorcycle fuel which has been put into intermediate storage by the activated carbon filter is fed to the engine so that emission rates which are as high as possible for the activated carbon filter are desirable for that purpose. The emission of fuel from the activated carbon filter again is promoted by high temperatures. In operation of the motorcycle therefore in general higher temperatures should prevail in the region of the activated carbon filter so that arranging it in the proximity of the heat-generating internal combustion engine is desirable. Naturally arranging it too close to the engine is not possible to avoid thermal damage. In order to satisfy those requirements which in themselves are contradictory EP 2 258 938 provides for arranging the container below the fuel tank and at the same time above the engine. In accordance with EP 2 279 936 in turn arranging the container in motorcycles in front of the fuel tank and behind the headlight is expedient.

In order to avoid long feed lines the device for suppressing the emission of evaporated fuel, for the most part in the form of a container, is arranged in the proximity of the fuel tank. That gives rise to the problem that, for maintenance operations, the parts of the vehicle disposed therebeneath are difficult to access and the container frequently has to be removed. On the other hand the maintenance of those parts of the motorcycle is made more difficult, in which respect service technicians have to proceed particularly carefully with the lines connected to the container in order to avoid damage.

SUMMARY OF THE INVENTION

The object of the present invention is to avoid those disadvantages and to provide a motorcycle in which there is provided a device for reducing evaporative emission with a container for the storage of evaporated fuel, which is arranged at a position that is favorable in terms of the effectiveness of the container, while maintenance of devices or motorcycle parts arranged below the fuel tank is facilitated.

The invention concerns a motorcycle having an internal combustion engine. In the case of the present invention, the term 'internal combustion engine' is used to mean engines whose fuel is carried in the fuel tank in liquid form, like for example petrol or diesel engines. The term motor 'cycle' is intended to mean usually single-track motor vehicles, including motor-assisted bicycles.

In the case of motorcycles further parts of the vehicle like for example the engine are arranged beneath the fuel tank. By virtue of pivotable mounting of the fuel tank relative to the frame, wherein the pivotal movement is between a first position, the so-called position of use, in which the motorcycle is ready to ride, and a second position, the so-called maintenance position, the devices and parts of the vehicle arranged beneath the tank are particularly readily accessible for maintenance measures as in the pivotal movement the fuel tank is pivoted upwardly into the maintenance position.

In addition the container in the case of motorcycles in which the fuel tank is for the most part arranged at the top side of the vehicle is protected from sunlight in the position of use by at least partial coverage of the container by the fuel tank so that desirable cooler conditions can be implemented for the absorption of evaporated fuel when the motorcycle is not in operation. Furthermore, the at least partial coverage of the container by the fuel tank in the position of use also provides protection from mechanical damage. Frequently the internal combustion engine is also disposed beneath the fuel tank. The container is not only protected from sunlight by an arrangement in which it is at least partially covered by the fuel tank in the position of use, but in addition it is disposed in the proximity of the engine so that the higher temperatures which are desired during operation of the motorcycle can be afforded for the container.

The container can be arranged in such a way that it is easily accessible after pivoting the fuel tank into the maintenance position. This is the case, for example, when the container is arranged directly under the fuel tank or is pivoted together with the fuel tank.

In a preferred embodiment, the container is fixed at an underside and additionally or alternatively at a front side of the fuel tank. In that respect the underside faces towards the ground, while the front side relates to the usual direction of travel. In the case of a motorcycle the front side of the fuel tank is thus towards the steering system. In the case of fixing at an underside the feed line from the fuel tank to the container can be particularly short. In addition the container is particularly well protected from sunlight by virtue of fixing at the underside of the fuel tank. Furthermore fixing at the underside of the fuel tank also provides particularly good protection from mechanical damage. In the case of an internal combustion engine disposed beneath the fuel tank the container is disposed in the proximity of the engine by virtue of fixing on the underside and/or front side of the fuel tank so that the higher temperatures which are desired during operation of the motorcycle can be provided for that container without running the risk of being thermally damaged as a certain distance from the engine is defined by the fixing to the fuel tank.

As a consequence of the pivotable mounting of the fuel tank relative to the frame of the motorcycle, with the fuel tank being pivotable between a maintenance position and a position of use in which the motorcycle is ready to ride, it is possible to pivot the fuel tank into the maintenance position in order thereby to have easy access to the parts of the vehicle which are disposed beneath same. Insofar as the device for suppressing emissions of the fuel evaporating from the fuel tank, said device being in the form of a container, is fixed at the fuel tank and pivoted jointly with same, access to the parts of the vehicle which are beneath it is particularly easy and the container does not have to be separately removed. The container itself and the device arranged therein for the storage of evaporated fuel, for example an activated carbon filter, involves devices which are known per se in the state of the art. For example the container can be a design from the concern Sentec or a design from LydsTech which are each equipped with an activated carbon filter for storage of the emitted fuel gas.

Assembly of a motorcycle according to the invention is substantially facilitated by fixing of the container at the fuel tank and possibly also the feed and discharge lines to and from the container, wherein moreover the necessary number of clips and holders on the frame can be reduced and it is possible to have a tidier run arrangement for the feed and discharge lines. By virtue of the joint pivotability the container together with the feed and discharge lines is pivoted with the fuel tank so that the parts of the vehicle below same are particularly readily accessible. The container itself is also easily accessible after pivoting the fuel tank.

A further problem is the risk of liquid fuel penetrating into the container as otherwise the activated carbon filter arranged therein could be damaged or even destroyed. To prevent liquid fuel from running out, for example if the motorcycle falls over in the event of an accident, there is admittedly provided in some cases a so-called rollover valve which is frequently disposed in the feed line from the fuel tank to the container so that this automatically provides protection for the container in regard to the ingress of liquid fuel. However it may also be desirable for that rollover valve not to be arranged in the region of the feed line to the container, but in the region of the discharge line from the container. In addition the mode of operation of the rollover valve also depends in part on the direction in which the fuel tank is tipped. If the fuel tank is pivoted upwardly the functionality of the rollover valve can be limited.

For that purpose it can be provided that the container, relative to the feed line by way of which the container is connected to the fuel tank, is fixed at the position on the fuel tank, preferably at the underside and/or the front side thereof, such that upon pivotal movement of the fuel tank into the maintenance position, a flow of liquid fuel into the container is prevented. That is advantageous in particular when there is no rollover valve.

For that purpose it can be provided that the pivotable mounting of the fuel tank is at a first half of the fuel tank while the container is fixed to the fuel tank in the region of the other half of the fuel tank, so that, with the pivotal movement of the fuel tank from the position of use into the maintenance position, the other half which is opposite to the first half and thus also the container fixed to said half is pivoted upwardly. If in comparison the container is fixed to the fuel tank at a location at which the container is not moved or is only little moved during the pivotal movement of the fuel tank it can happen that liquid fuel in the fuel tank penetrates into the feed line and further into the container and thus the device arranged in the container for the storage of evaporated fuel, in particular an activated carbon filter, is damaged. By virtue of fixing on that half of the fuel tank which is opposite to the first half, the container, in comparison with the feed line in the fuel tank, is in an elevated position in which no liquid fuel can pass into the container in spite of the pivotal movement. Accordingly the fuel tank can be pivoted into the maintenance position without running the risk of liquid fuel penetrating into the container. Damage can be prevented thereby.

It is preferably provided in that respect that the half in that case relates to the longitudinal direction of the fuel tank which corresponds in the case of motorcycles to the longitudinal direction of the motorcycle. The pivotable mounting is provided at the half which is the rear half in the direction of travel and fixing of the container is provided at the half which is the front half in the direction of travel, or vice-versa. In that case the fuel tank is pivoted about an axis arranged perpendicularly to the longitudinal direction of the vehicle, this being the transverse direction. It is however also possible for the half of the fuel tank to refer to the transverse direction arranged perpendicularly to the longitudinal direction. In that case the pivot axis is disposed in the longitudinal direction.

The protection from the ingress of liquid fuel is even better if the pivotable mounting of the fuel tank is at a first end region of the fuel tank and fixing of the container is at a second end region opposite to the first end region. By virtue of fixing at a second end region opposite to the first end region the container in the maintenance position of the fuel tank, in comparison with the feed line in the fuel tank, is in a still further elevated position so that penetration of liquid fuel into the container in the pivotal movement is even better prevented.

It is preferably provided that the front end region in that case refers to the front third in the longitudinal direction, preferably the front quarter of the fuel tank. In that case the pivotable mounting is provided at the rear third in the direction of travel, preferably the rear quarter, and fixing of the container is on the front third in the direction of travel, preferably the front quarter, or vice-versa. In that case the fuel tank is pivoted about an axis arranged perpendicularly to the longitudinal direction of the vehicle, this being the transverse direction. It is however also possible for the first and second end regions of the fuel tank to relate to the transverse direction which is perpendicular to the longitudinal direction. In that case the pivot axis is arranged in the longitudinal direction.

Although in itself it can also be envisaged that the pivotable mounting is afforded by specially shaped parts of the fuel tank and parts of the motorcycle corresponding thereto, without the fuel tank being fixedly connected to the motorcycle in the region of the mounting location, a preferred configuration of the invention provides that the fuel tank is mounted pivotably to the motorcycle by way of a preferably releasable joint connection. The joint connection is preferably in the form of a hinge. It is preferably also provided that the joint connection comprises two or more joint connections, for example one at the edge region of the fuel tank, that is at the left in the direction of travel, and one at the edge region of the fuel tank, that is at the right in the direction of travel. For example therefore two hinges, for example one at the left and one at the right in the direction of travel, can be provided on the fuel tank. It can also be provided that the pivotable mounting, in particular the joint connection, is arranged entirely at an end of the fuel tank while fixing of the container is in the oppositely disposed end region.

It is preferably provided that the pivotable mounting of the fuel tank is of such a design configuration that it is mounted pivotably about an axis arranged perpendicularly to the longitudinal direction of the motorcycle, that axis being arranged in the transverse direction of the vehicle. In the upright state of the vehicle the transverse direction and also the longitudinal direction are oriented horizontally.

Motorcycles generally have fuel tanks which are of greater dimensions in the longitudinal direction of the vehicle than in the direction perpendicular thereto. With a pivotable mounting about an axis arranged perpendicularly to the longitudinal direction of the vehicle the fuel tank can therefore be pivoted over a greater region, that is to say the angle between the maintenance position and the position of use in which the motorcycle is ready to ride is greater. The maximum pivotal angle depends in particular on the geometry of the fuel tank and can be for example in a range of between 15° and 100°. The greater that angle, the correspondingly better is accessibility to the parts of the motorcycle below same.

The container is connected to the fuel tank by way of a feed line. Evaporated fuel is passed to the container by way of that feed line. It is also possible to provide a discharge line by way of which evaporated fuel is fed to the engine. This usually involves fuel in gas form, which is re-emitted by the storage device in the container, for example in the form of an activated carbon filter. The feed to the internal combustion engine is effected in that case in a manner known per se from the state of the art, wherein the gaseous fuel is firstly fed to a throttle flap or directly into the induction manifold and from there together with the usual fuel-air mixture to the internal combustion engine. The container can also be connected to a discharge flow line. The discharge flow line serves to discharge the evaporated fuel which is re-emitted by the storage device in the container into the environment when the motorcycle is not in operation and therefore re-emitted fuel gas cannot be burnt by the engine. Damage to the container can therefore be avoided by virtue of that discharge flow line.

The container itself is preferably made from plastic, for example polyamide. It would also be possible however to make the container from metal. The feed line, the discharge line and the discharge flow line preferably involve flexible, gasoline-resistant hoses, for example of rubber like for example EPDM. By virtue of the flexibility of the hoses they can be flexibly positioned, thereby avoiding damage to the feed, discharge and discharge flow line in the pivotal movement of the fuel tank. In particular there is no need to remove those lines before the pivotal movement.

It can be provided that the feed line and additionally or alternatively the discharge line and additionally or alternatively the discharge flow line are fixed to the fuel tank. That has the advantage that, in the pivotal movement of the fuel tank from the position of use into the maintenance position, not only the container but also the lines connected to the container are at least also partially pivoted therewith so that parts of the motorcycle below same are particularly easily accessible. Devices which are known per se in the state of the art, like for example metal clips and/or elastic fixing means, are used for fixing the lines. In particular it can be provided that the entire emission system is fixed to the fuel tank. The term emission system is used in the present case to denote the system for temporary storage and re-emission of fuel evaporating in the fuel tank. Besides the container and the storage device arranged in the container, for example in the form of an activated carbon filter, this includes the feed line from the fuel tank to the container, the discharge line from the container in the direction of the engine and possibly the discharge flow line, a venting valve (purge valve) and one or more rollover valves to prevent the escape of liquid fuel.

It can be provided that the emission system further includes a control device with which re-emission and/or the feed of re-emitted fuel gas to the engine is effected in dependence on the engine state. That control device can also be fixed to the fuel tank. It can however also be provided that the control device is arranged separately at another location on the motorcycle. Finally the control device can also be part of the purge valve.

The pivotable mounting of the fuel tank can be provided on the side thereof, that is remote from the steering system. In motorcycles the fuel tank is also arranged behind the steering system, in a side view. If the fuel tank is mounted pivotably on the side of the fuel tank, that is remote from the steering system, that is to say on the rear side in the direction of travel, then the side of the fuel tank, that is towards the steering system, is pivoted upwardly in the pivotal movement into the maintenance position. When the container is fixed on that half or that end region of the fuel tank, that is towards the steering system, the container is pivoted upwardly sufficiently far to prevent liquid fuel from passing into same. In addition in that arrangement the container can be placed both in the proximity of the engine and also the radiator so that in operation of the engine hot but not excessively hot ambient temperatures for the container prevail. After the motorcycle is switched off the radiator can additionally cool the container. For that purpose it can be provided that the container in the position of use of the fuel tank is arranged above the motor and behind the radiator.

In addition in motorcycles a saddle frequently adjoins the fuel tank, in the region of which the fuel tank can be mounted pivotably. In the case of a joint connection for the pivotable mounting, that can be covered by the saddle and thus protected.

The fuel tank can be mounted to the frame. In the case of a joint connection for that purpose a part of the joint connection can be provided on or fixed to the fuel tank while the corresponding counterpart portion is provided on or fixed to the frame. The frame in that case can have lateral elements arranged on the left-hand and the right-hand sides of the frame, as viewed in the direction of travel. The container can be arranged between the lateral elements. Parts arranged within the lateral elements are particularly well protected from mechanical damage. With this arrangement therefore that also applies to the container. Cladding or fairing parts are frequently arranged on the lateral elements. In that case the container is particularly effectively protected from sunlight. Besides the container it can also be provided that further parts of the emission system like for example the feed line, the discharge line and/or the discharge flow line, a purge valve and any rollover valves are arranged within the lateral elements.

In a particular embodiment the frame is in the form of a double tube frame, wherein each of the lateral elements has a top frame tube and a base frame tube. In that case the container in the position of use of the fuel tank can be arranged substantially between the top frame tube and the base frame tube.

The mechanical stability of the frame is particularly high within the top frame tube and the base frame tube so that particularly good protection is afforded here. In this case also certain parts of the emission system like for example feed line, discharge line, discharge flow line and/or purge valve and rollover valve can be arranged substantially between the upper and lower longitudinal tubes. The frame itself can also be in the form of a trellis tube frame.

Preferably, the container is substantially cylindrical, which has been found to be advantageous in relation to its mode of operation. It can further be provided that the container is fixed to the fuel tank in such a way that the longitudinal direction of the container is perpendicular to the longitudinal direction of the motorcycle, particularly in the case of substantially cylindrical containers. It is preferably provided that the longitudinal direction of the container is disposed in the transverse direction of the vehicle. Fixing of the container to the fuel tank is effected for example by means of a mechanical clip and/or an elastic fixing means, but other fixing means are also possible.

Preferably, the container has a length in its longitudinal direction (longitudinal length) of between 20% and 90% of the length of the fuel tank in that direction (i.e., the width of the fuel tank). That applies, in particular, if the container is fixed to the fuel tank. Particularly preferably, the region is between 30% and 60%. For the situation where the longitudinal direction of the container, that is to say the direction of its greatest extent, is perpendicular to the orientation of the motorcycle, the container thus has a longitudinal length of between 20% and 90%, preferably between 30% and 60%, of the lateral extent (width) of the fuel tank. By the fuel tank projecting beyond the container, the container is particularly well protected. In addition, it is also possible in the region of such extent for parts of the emission system like for example feed line, discharge line, discharge flow line, purge valve and/or rollover valve to be covered by the fuel tank and thus protected. Excessively short values in respect of the extent of the container however are detrimental as they would be linked to an inadequate storage volume.

The container in the position of use of the fuel tank can be arranged at least partially and preferably entirely above the lower end of the fuel tank. This means that, in a side view of the motorcycle, the container is arranged at least partially and preferably entirely above a notional horizontal plane at the rear end of the fuel tank. Particularly if the container is fixed at the underside of the fuel tank then for that purpose the underside of the fuel tank is inclined upwardly or has a suitable bulge for the container.

The container can be fixed to the fuel tank in such a way that it is arranged at least partially and preferably entirely in a side view behind a notional vertical plane at the front end of the fuel tank.

BRIEF DESCRIPTION OF THE DRAWINGS

Further details and advantages of the present invention will be described with reference to the specific description hereinafter. In the drawings.

DETAILED DESCRIPTION OF THE INVENTION

Figure 1A:
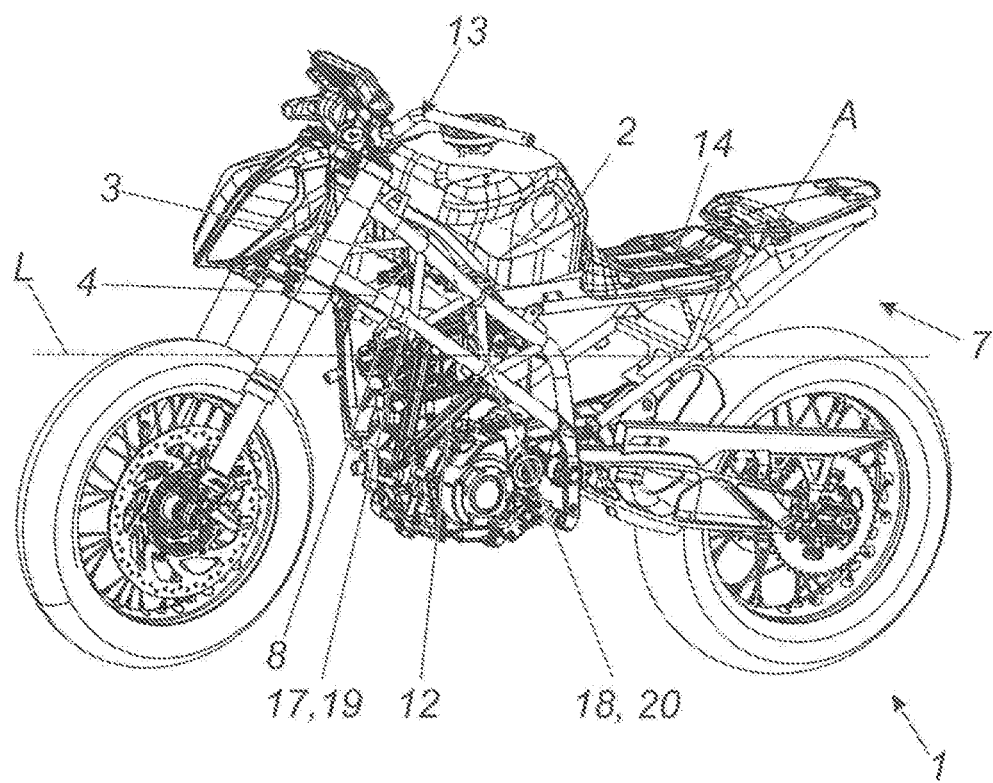
FIGS. 1a-1d are a perspective view, a plan view, a view from the front and a view from the rear of a motorcycle according to the invention.

FIG. 1a shows a perspective view of a motorcycle 1 according to the invention, with a container 3 being fixed at the underside 8 of the fuel tank 2. The fuel tank 2 is mounted pivotably by means of a joint connection 6 about an axis A arranged in the transverse direction of the motorcycle 1, that is to say perpendicularly to the longitudinal direction L of the motorcycle 1, with the joint connection 6 being covered by the saddle 14. Depending on the respective configuration of the joint connection 6 it may therefore be necessary to remove the saddle 14 beforehand, for the pivotal movement of the fuel tank 2. The frame 7 of the motorcycle 1 is in the form of a trellis tube frame, with the container 3 being arranged between the left-hand lateral element 15 and the right-hand lateral element 16 and being disposed in the position of use of the fuel tank 2 substantially between the top frame tubes 18, 20 and the base frame tubes 17, 19 of the left-hand lateral element 15 and the right-hand lateral element 16 of the frame 7. The engine 12 is arranged beneath the fuel tank 2 so that the heat given off by the engine 12 increases the ambient temperature for the container 3 whereby the storage device disposed in the interior of the container 3 has a higher rate of re-emission of fuel gas. The radiator 24 which is not shown in this Figure for reasons of clarity of the drawing is disposed in front of the engine 12 and continues to run on for a certain time after the motorcycle 1 is switched off in order to cool the engine 12. In that position of the container 3 it is also cooled by the radiator 24 so that this gives the conditions which are favorable after the motorcycle 1 is switched off, for a high absorption rate of the storage device disposed in the container 3.

Figure 1B:
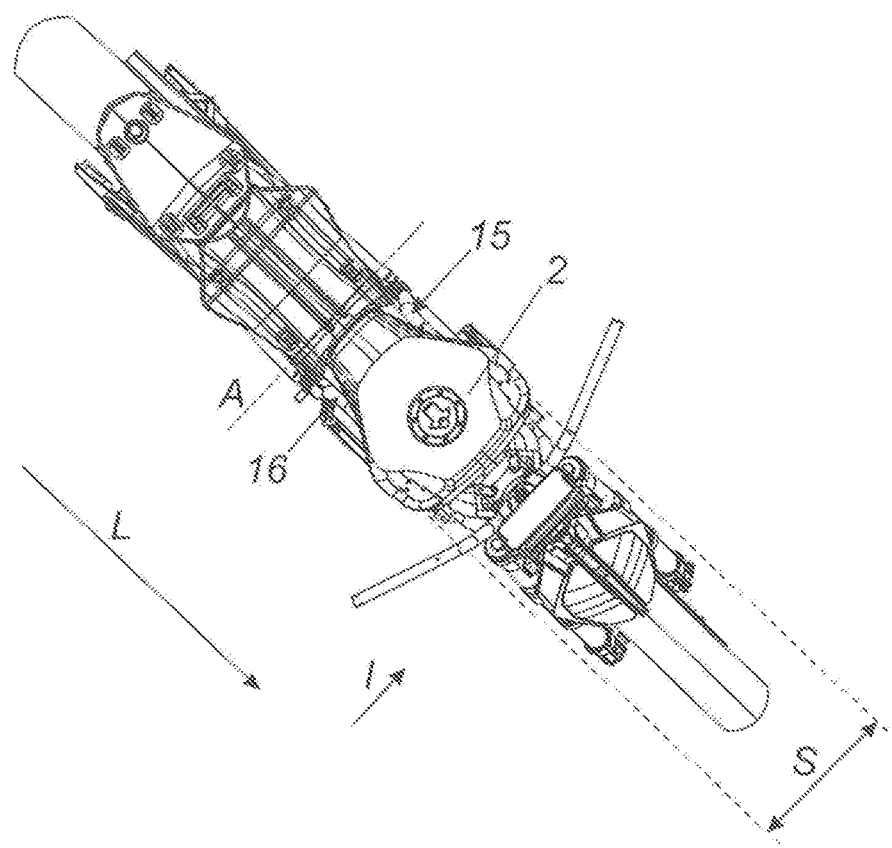
Figure 1C:
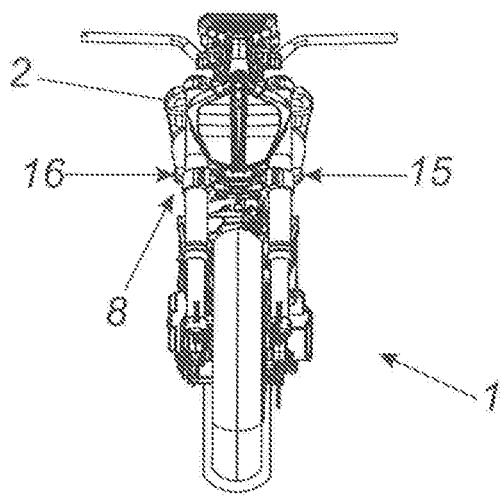

FIG. 1b shows a plan view of the motorcycle 1 according to the invention. The container 3 is fixed at the underside 8 of the fuel tank 2 and is covered by same. The container 3 is arranged in such a way that its longitudinal direction I is arranged in the transverse direction of the motorcycle 1, that is to say perpendicularly to the longitudinal direction L of the motorcycle 1. The lateral extent (width) S of the fuel tank 2 in the transverse direction of the motorcycle 1 is greater than the length of the container 3 in its longitudinal direction I, thereby giving the coverage according to the invention of the fuel tank 2. The fuel tank 2 is mounted pivotably about an axis A, with the axis A being arranged in the transverse direction of the motorcycle 1, therefore perpendicularly to the longitudinal direction L of the latter.

Figure is shows a view from the front of the motorcycle 1 according to the invention. In the front half the underside 8 of the fuel tank 2 is inclined upwardly in the illustrated embodiment in the position of use whereby the fuel tank 2 is adapted to the top frame tubes 18, 20 (see FIG. 2) which also face upwardly. The container 3 is arranged in the first end region 4 of the fuel tank 2, that corresponds to the front quarter, and thus in the upwardly inclined region of the underside 8. As can be seen from the front view the container 3 in this view is covered by the components disposed in front of same, like for example the headlight, so that here too there is a certain protection.

Figure 1D:
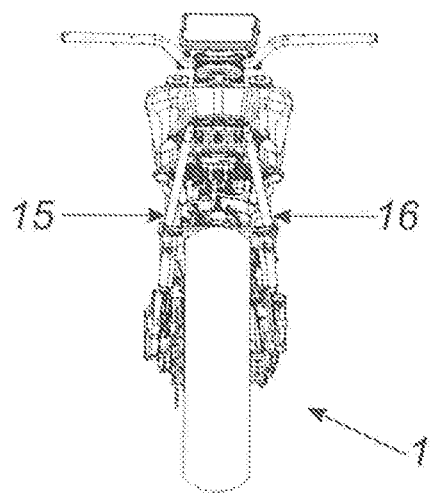

FIG. 1d shows a view from the rear of the motorcycle 1 according to the invention.

Figure 2:
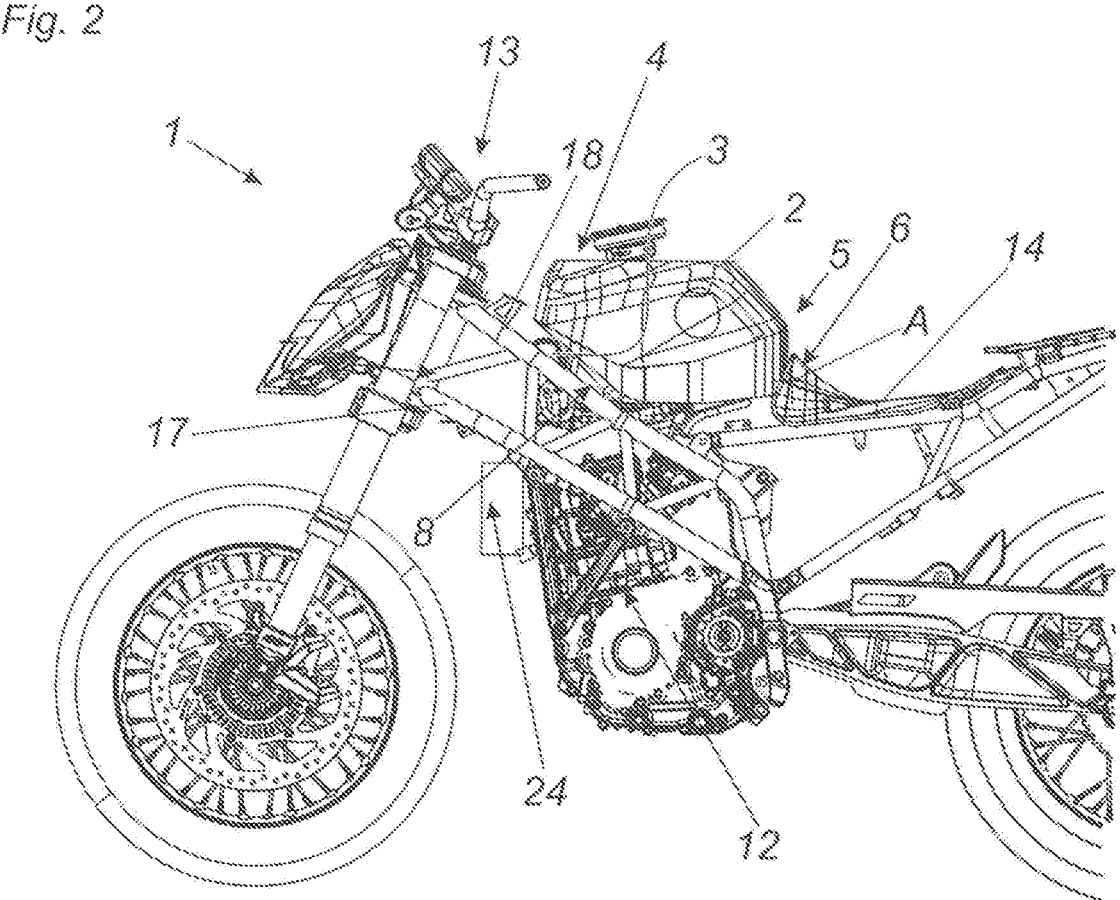
FIG. 2 is a diagrammatic side view of a motorcycle according to the invention, with the fuel tank in the position of use.

FIG. 2 shows a diagrammatic side view of the motorcycle 1 according to the invention, with the fuel tank 2 in the position of use in which the motorcycle 1 is ready to ride. The diagrammatic view does not correspond to the actual motorcycle as some components are not illustrated in their entirety or are illustrated only diagrammatically. The container 3 is arranged at the underside 8 of the fuel tank 2 in a first end region 4 towards the steering system 13. Provided in the second end region 5 opposite to the first end region 4 is a joint connection 6 with which the fuel tank 2 is pivotable about an axis A from the position of use into a maintenance position. The joint connection 6 is arranged at the rear end of the fuel tank 2 and is covered by the saddle 14 in the operative state of the motorcycle.

In the position of use the container 3 is protected by the top frame tubes 18, 20 and base frame tubes 17, 19 (see FIGS. 1a and 1b) arranged on the left-hand lateral element 15 and the right-hand lateral element 16 of the frame 7. The diagrammatically illustrated radiator 24 is disposed in front of the engine 12 as viewed in the direction of travel and after the motorcycle 1 is switched off cools down the engine 12 but also the container 3 and the storage device arranged therein. In operation of the motorcycle 1 fuel re-emitted by the storage device is fed to the engine by way of the discharge line 10. Fuel which evaporates in the fuel tank 2 is passed to the container 3 by way of the feed line 9 and stored by the storage device arranged in the container, for example in the form of an activated carbon filter.

Figure 3A:
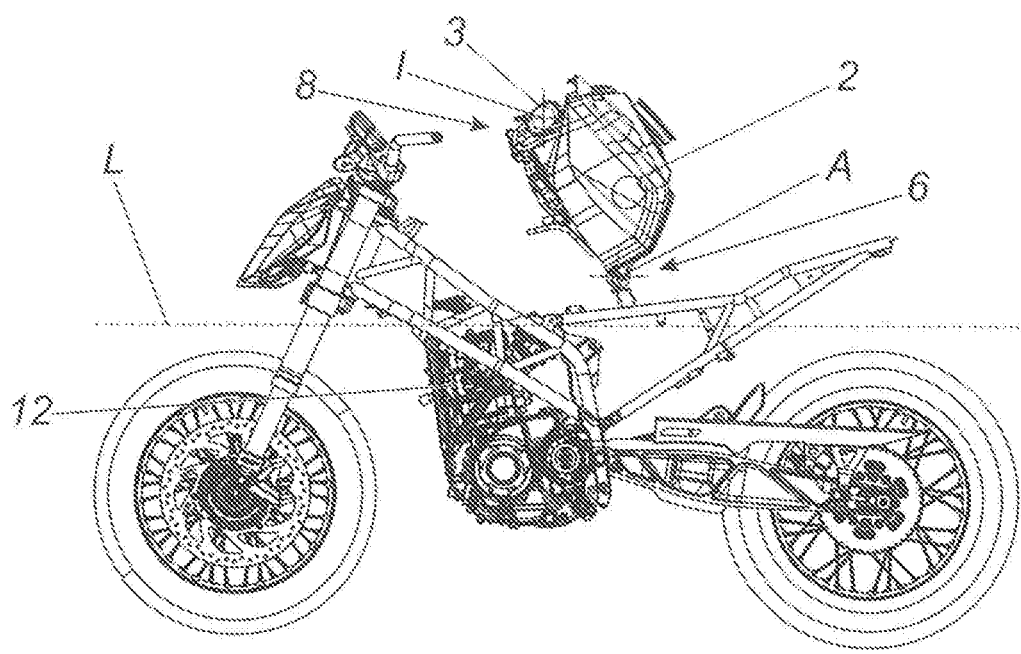
FIGS. 3a and 3b are a diagrammatic side view of a motorcycle according to the invention, with the fuel tank in the maintenance position, and a perspective detail view thereof.

FIG. 3a shows a further diagrammatic side view, with the fuel tank 2 now being pivoted into the maintenance position. The pivot axis A is arranged in the transverse direction of the motorcycle 1, that is to say perpendicularly to the longitudinal direction L of the motorcycle 1. The longitudinal direction I of the container 3 also faces in the direction of the axis A. The container 3 is fixed at the underside 8 of the fuel tank 2 and is pivoted upwardly jointly therewith. The feed line 9 and the discharge line 10 (see FIG. 6b) are in the form of flexible hoses and are not damaged in spite of the pivotal movement and can be flexibly placed. The components arranged under the fuel tank 2, in particular the cylinder head, are readily accessible for maintenance measures in that position.

Figure 3B:
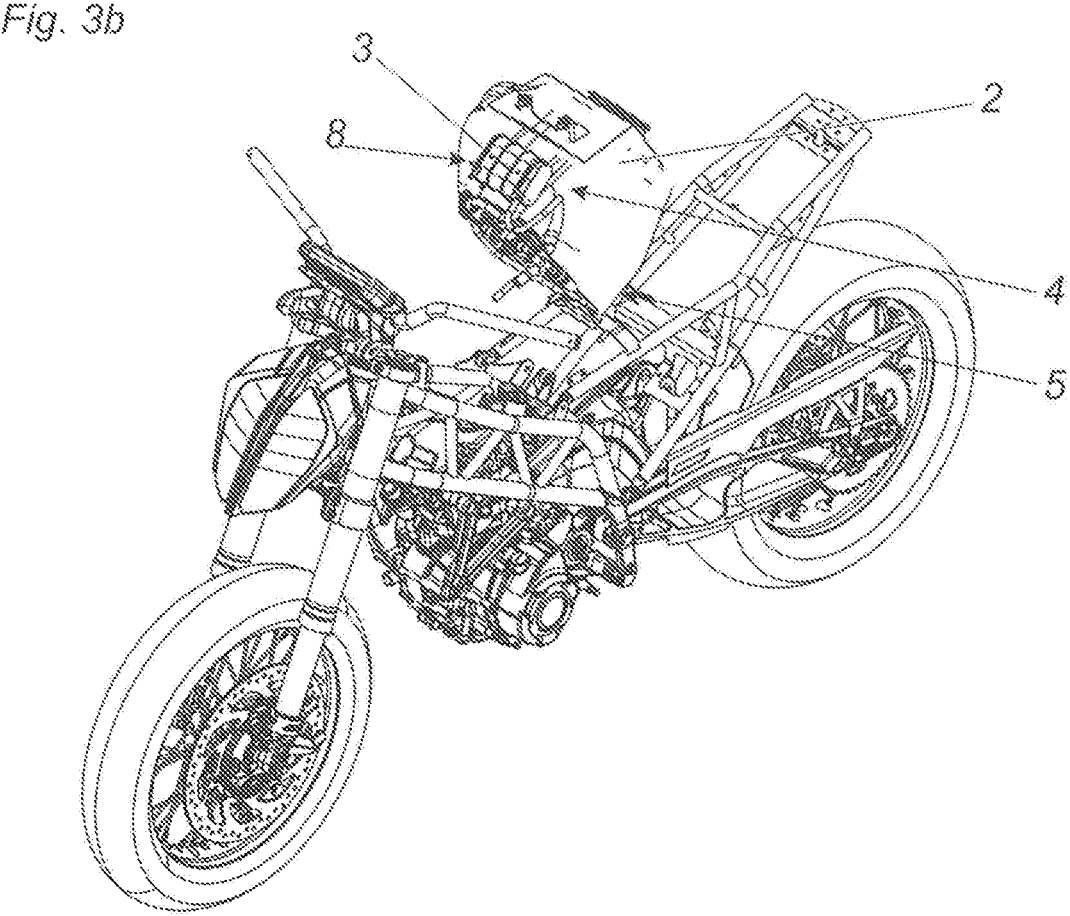

FIG. 3b shows a diagrammatic perspective view illustrating a detail of the fuel tank 2 in the maintenance position. It can be seen that the container 3 is fixed to the fuel tank 2 in a front end region at the underside 8 of the fuel tank 2. The underside 8 is inclined upwardly in that region. The parts of the motorcycle arranged under the fuel tank 2 are readily accessible in the maintenance position. By virtue of the arrangement of the container 3 in the front end region 4 and the pivotable mounting in the rear end region 5 it is possible even without a rollover valve to prevent liquid fuel from passing into the container 3 in the pivotal movement.

Figure 4:
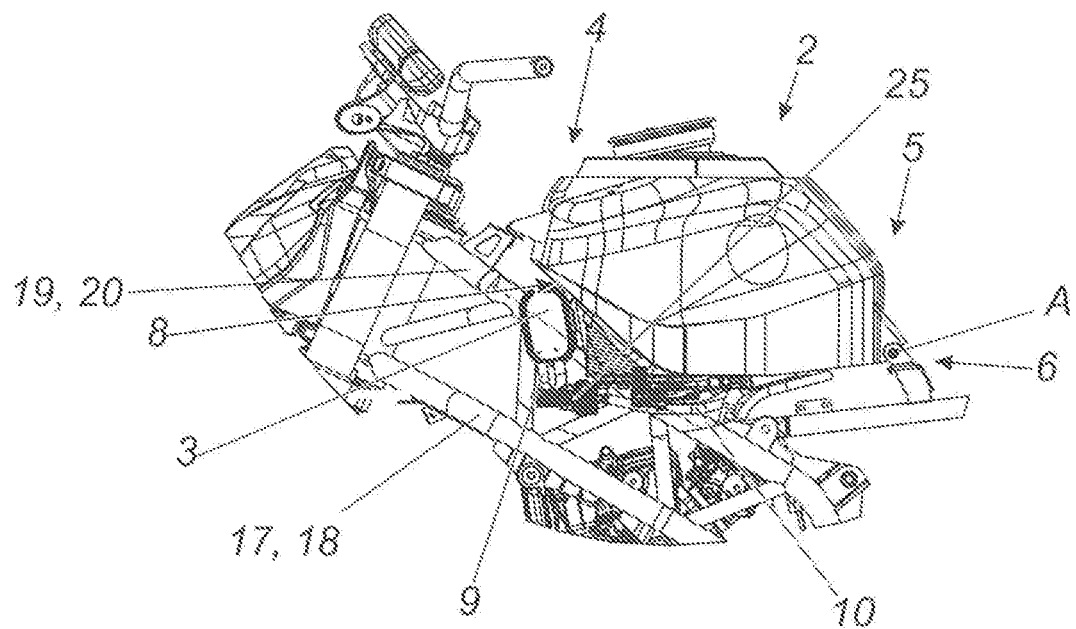
FIG. 4 is a diagrammatic side view of parts of the motorcycle according to the invention.

FIG. 4 shows a diagrammatic side view of parts of the motorcycle 1 according to the invention, the fuel tank 2 being in the position of use. The container 3 is fixed at the underside 8 of the fuel tank 2 in the front end region 4, corresponding to the front quarter of the fuel tank 2, and is pivoted jointly therewith into the maintenance position, the pivot axis A being arranged in the opposite second end region 5. It can be clearly seen that the container 3 and the feed and discharge lines 9, 10 and also the purge valve 25 are enclosed and well protected by the top frame tubes 19, 20 and the base frame tubes 17, 18 in the position of use.

Figure 5:
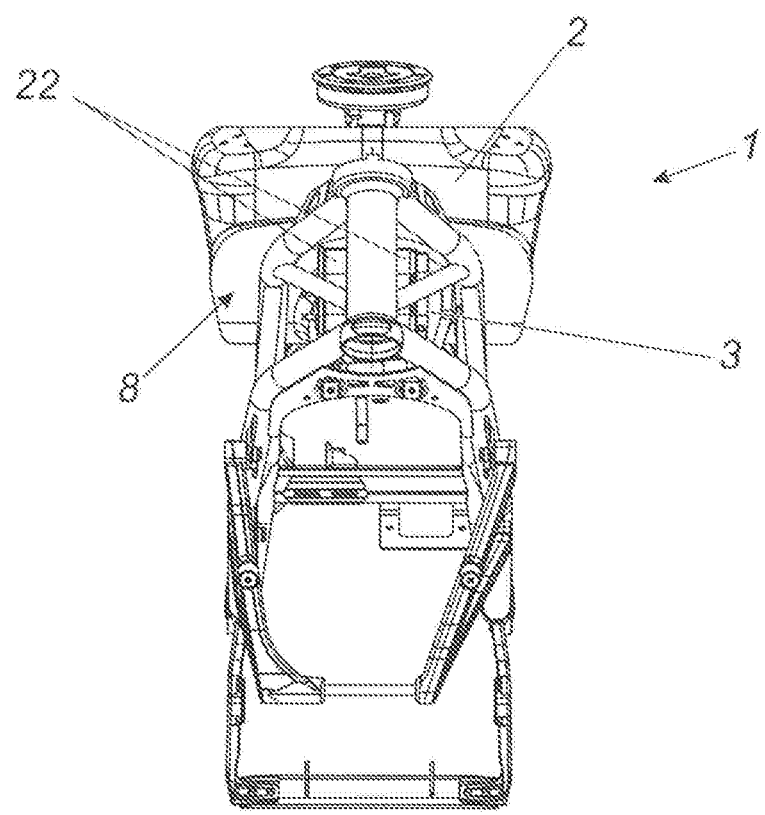
FIG. 5 is a diagrammatic front view of parts of the motorcycle according to the invention.

FIG. 5 shows a diagrammatic view from the front of parts of the motorcycle 1, in which respect it is possible to see the fixing of the container 3 on the underside 8 of the fuel tank 2, elastic fixing means 22 being arranged around the cylindrical container 3. The fixing means 22 are fixed by way of further fixing means (not visible in this view), for example a clip 21, at the underside 8 of the tank 2. The feed line 9 is in the form of a flexible hose which opens from the fuel tank 2 into the container 3 by way of a purge valve 25.

Figure 6A:
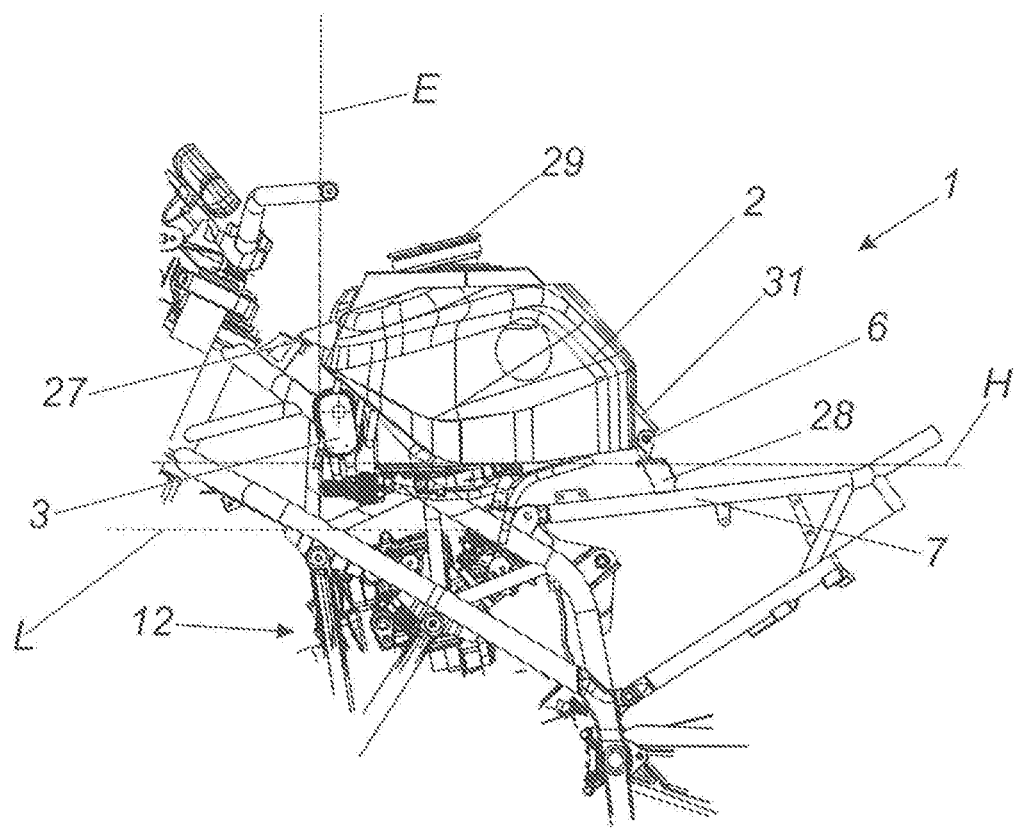
FIGS. 6a and 6b are a side view and a perspective view from below of the fuel tank with container fixed thereto.
Figure 6B:
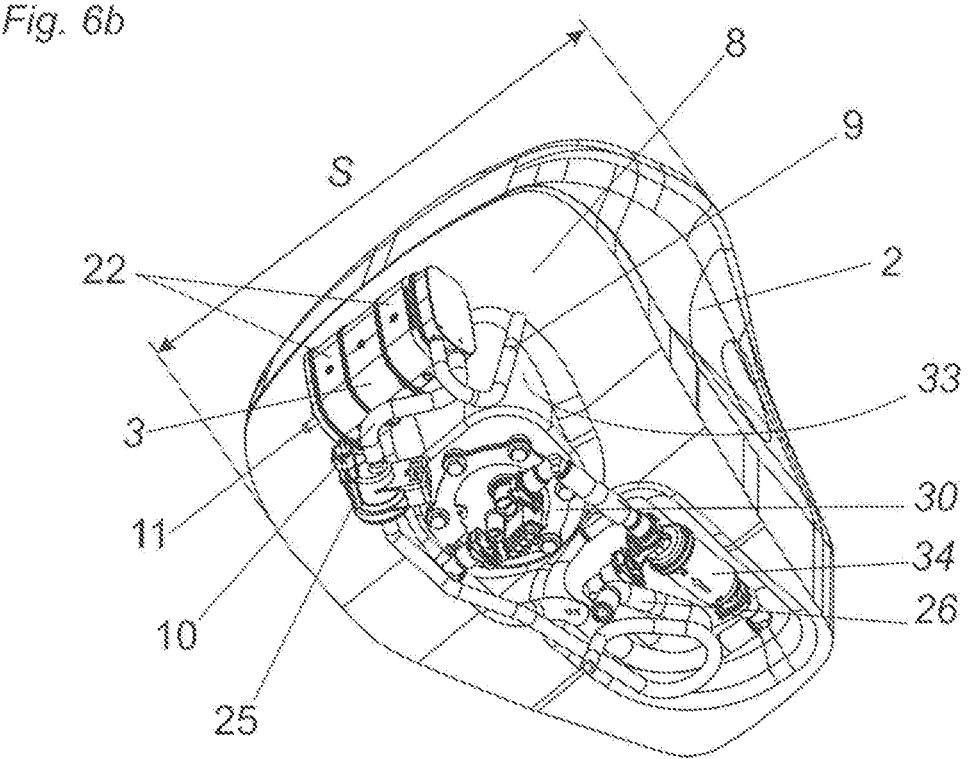

FIGS. 6a and 6b show the fuel tank 2 of the motorcycle 1 according to the invention in the position of use as a side view and a perspective view from below. It is possible to see on the one hand the joint connection 6 arranged at the rear end and thus also in the rear end region, by way of which the fuel tank 2 can be pivoted into the maintenance position from the position of use in which the motorcycle 1 is ready to ride. In the illustrated embodiment the joint connection 6 on the one hand has a second flange 31 on the fuel tank 2 and a first flange 28 fixed to the frame 7. It will be appreciated that this can also be provided in reverse or implemented with other means.

Provided at the front end are fixing means 27 which can prevent the fuel tank 2 from being unintentionally pivoted into the maintenance position. A pivotal movement is possible only after release of the fixing means 27. Arranged at the lower end of the fuel tank 2 is the fuel supply 30 including the fuel pump which is responsible for supplying the engine 12 with fuel by way of the fuel filter 34 and the fuel line 26.

The substantially cylindrical container 3 is fixed at the upwardly inclined front end region of the underside 8, the longitudinal direction I of the container 3 being arranged in the transverse direction of the motorcycle 1, that is to say perpendicularly to the longitudinal direction L thereof. The container 3 is well protected from mechanical stressing by the fixing at the underside 8, wherein the in part cylindrical bulge 33 of the underside 8 of the fuel tank 2, at which the fuel supply 30 with the fuel pump is arranged, can provide further protection for the container 3 which in this embodiment is fixed immediately in front of the bulge 33 at the underside 8 of the fuel tank 2. The feed line 9 and/or the discharge line 10 can be fixed to the fuel tank 2, for example with elastic fixing means. That however is not shown in FIGS. 6a and 6b.

That permits pre-installation of the emission system on the fuel tank 2, whereby assembly of the motorcycle 1 is facilitated. In that respect the container 3 is fixed to the fuel tank 2 in such a way that in the illustrated side view it is disposed entirely behind a notional vertical plane E at the front end of the fuel tank 2 and above a notional horizontal plane H at the lower end of the fuel tank 2.

FIG. 6b shows a perspective view from below of the tank in FIG. 6a, in which respect it can be seen that the longitudinal length of the cylindrical container 3 fixed at the underside 8 of the fuel tank 2 is about 40% of the lateral extent (width) S of the fuel tank 2 and is thus covered by the fuel tank 2. By virtue of that size both the container 3 and also the feed line 9, the discharge line 10 and the purge valve 25 can be disposed between the left-hand lateral element 15 and the right-hand lateral element 16 of the frame 7 so that this affords optimum protection from mechanical damage. By virtue of the underside 8 of the fuel tank 2 facing upwardly in the front half, this affords further protection by the transverse struts with which the top frame tubes 19, 20 are connected to the base frame tubes 17, 18. The purge valve 25 is arranged in the discharge line 10 and in this embodiment controls the feed of fuel gas re-emitted from the container 3 to the engine 12 in dependence on the operating state of the engine 12. In this embodiment therefore the purge valve 25 is an electronically controlled valve.

The container 3 is fixed to the fuel tank 2 with elastic fixing members 22 in the form of two bands or straps. For that purpose, the fixing members 22 are fixed to clips 21 arranged in turn on the fuel tank 2. At the underside of the fuel tank 2 the feed line 9 issues from the fuel tank 2 and then extends further to the container 3. The discharge line 10 issues from the container, by way of which fuel gas is fed to the engine 12. A purge valve 25 is arranged in the course of the discharge line 10 to check and control that feed of fuel gas. A separate discharge flow line is not provided in this embodiment.

Arranged on the container 3 on one end are air intake and venting devices 11, by way of which air can be drawn into the container 3 to the storage device arranged therein for fuel gas in order to support operation of the storage device and in particular re-emission. In addition fuel gas can escape from the container 3 by way of the air intake and venting devices 11, for example if too much fuel gas is emitted in the rest state of the motorcycle 1, if that cannot be consumed by the engine 12. The illustrated devices 11 also take over the functions of the discharge flow line. The devices 11 can alternatively be embodied in a single device or also in a plurality of devices.

Figure 7:
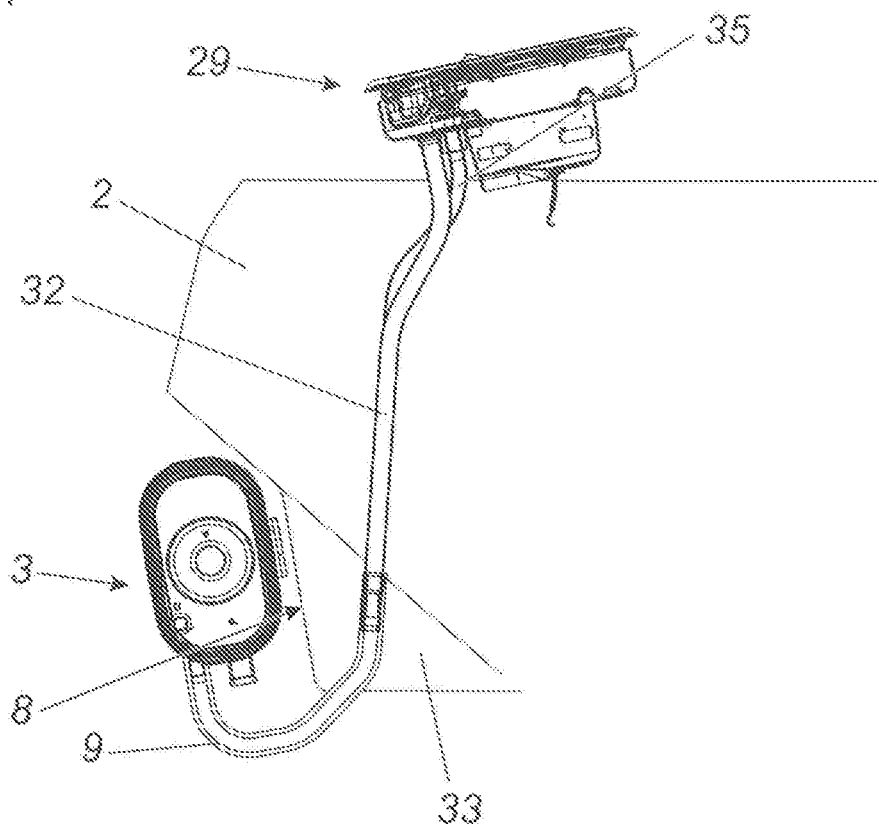
FIG. 7 is a diagrammatic view of the interior of the fuel tank in relation to the feed line to the container.

FIG. 7 shows a diagrammatic view of the fuel tank 2 and the feed line tube 32 which is at least partially arranged in the fuel tank 2 and which is sealingly connected to the feed line 9. In that arrangement the connection of the feed line 9 and the feed line tube 32 can be arranged within or outside the fuel tank 2. The feed line tube 32 extends into the tank top 29 arranged at the top side of the fuel tank 2. By way of an opening (not shown in this view) in the tank top 29 fuel which has evaporated in the fuel tank 2 can flow into the feed line tube 32 and from there further into the feed line 9, in which case the gas is subsequently stored by the storage device arranged in the container 3. The tube 35 which is shown in this view is a tank overflow, by way of which excess fuel filled into the tank can escape.

It is also clearly possible to see in FIG. 7 the cylindrical bulge 33 in the underside 8 of the fuel tank 2. In this embodiment the container 3 is fixed to the cylindrical bulge 33. The container 3 is ideally protected by virtue of the geometrical configuration of the underside 8 of the fuel tank.

Figure 8:
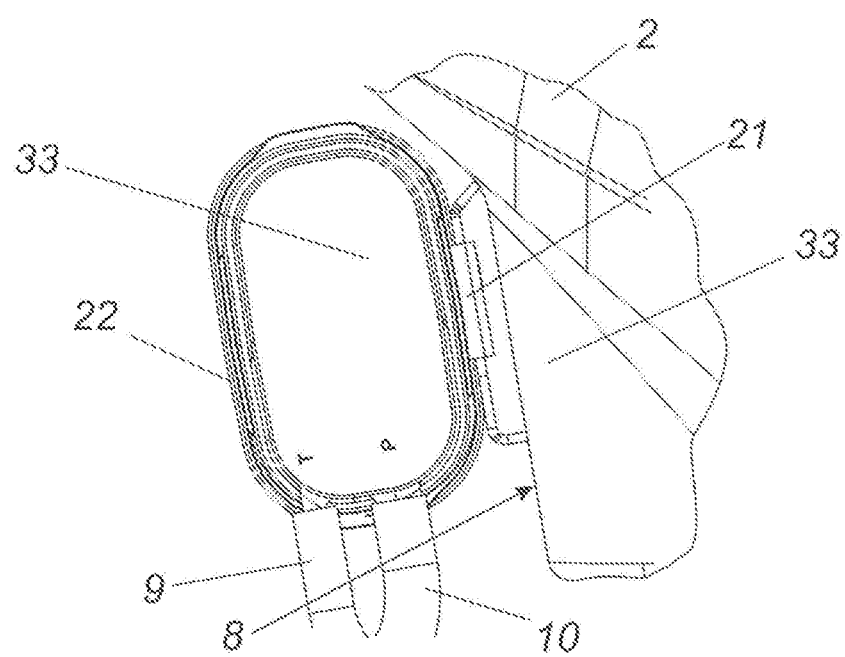
FIG. 8 is a view relating to the fixing of the container.

FIG. 8 shows a diagrammatic view of the fixing of the container 3 at the underside 8 of the fuel tank 2. In this case, the elastic fixing members (bands) 22 are fixed to a clip 21 which is provided on or fixed to the tank 2.

LIST OF REFERENCES 1 motorcycle
2 fuel tank
3 container
4 first end region
5 second end region
6 joint connection
7 frame
8 underside of the fuel tank
9 feed line to the container
10 discharge line from the container
11 air intake and venting device
12 internal combustion engine
13 steering system
14 saddle
15 left-hand lateral element
16 right-hand lateral element
17 base frame tube, left-hand lateral element
18 top frame tube, left-hand lateral element
19 base frame tube, right-hand lateral element
20 top frame tube, right-hand lateral element
21 clip
22 elastic fixing means
23 front side of the fuel tank
24 radiator
25 purge valve
26 fuel lines
27 fixing means
28 first flange
29 tank top
30 fuel supply
31 second flange
32 feed line tube
33 bulge
34 fuel filter
35 tank overflow
L longitudinal direction of the motorcycle
I longitudinal direction of the container
A axis
S lateral extent of the fuel tank
E vertical plane
H horizontal plane

The invention claimed is:

1. A motorcycle including:
an internal combustion engine,
a frame,
a fuel tank for carrying a fuel to be consumed by the internal combustion engine, and
a container connected to the internal combustion engine and the fuel tank, wherein the container is configured to store fuel evaporating from the fuel tank,
wherein the container in a position of use is at least partially covered by the fuel tank, and the fuel tank is supported pivotably relative to the frame between a maintenance position and the position of use, and
wherein the container is fixed to the fuel tank at an underside or at a front side or at an underside and a front side of the fuel tank and is pivotable jointly with the fuel tank.

2. The motorcycle as set forth in claim 1, wherein the fuel tank is mounted to the motorcycle pivotably by a joint connection.

3. The motorcycle as set forth in claim 2, wherein the joint connection is a hinge.

4. The motorcycle as set forth in claim 1, wherein the fuel tank is mounted pivotably about an axis arranged perpendicularly to a longitudinal axis of the motorcycle.

5. The motorcycle as set forth in claim 1, wherein the fuel tank is mounted pivotably to the frame.

6. The motorcycle as set forth in claim 1, wherein the container is connected to a feed line or a discharge line or a feed line and a discharge line, the container and fuel tank being configured such that fuel evaporating in the fuel tank is passed by the feed line to the container and fuel in operation of the motorcycle is passed by the discharge line from the container to the internal combustion engine, and the feed line or the discharge line or the feed line and the discharge line is or are fixed to the fuel tank.

7. The motorcycle as set forth in claim 6, further comprising an entire emission system fixed to the fuel tank.

8. The motorcycle as set forth in claim 1, wherein the motorcycle has a steering system, and the fuel tank is mounted pivotably on the side of the fuel tank remote from the steering system.

9. The motorcycle as set forth in claim 1, wherein the motorcycle has a saddle adjoining the fuel tank, and the fuel tank is mounted pivotably in the region of the saddle.

10. The motorcycle as set forth in claim 1, wherein the motorcycle has a frame having lateral elements at left-hand and right-hand sides as viewed in a direction of travel, the container being arranged between the lateral elements.

11. The motorcycle as set forth in claim 10, wherein the frame is a double-tube frame, each of the lateral elements has a top frame tube and a base frame tube, and the container in the position of use of the fuel tank is arranged between the top frame tube and the base frame tube.

12. The motorcycle as set forth in claim 11, wherein the frame is a trellis tube frame.

13. The motorcycle as set forth in claim 1, wherein the container is cylindrical.

14. The motorcycle as set forth in claim 1, wherein the container is arranged such that a longitudinal direction of the container is perpendicular to a longitudinal direction of the motorcycle.

15. The motorcycle as set forth in claim 1, wherein the container in the fixed state has a longitudinal length of between 20% and 90% of a width of the fuel tank.

16. The motorcycle as set forth in claim 15, wherein the longitudinal length of the container in the fixed state is between 30% and 60% of the width of the fuel tank.

17. The motorcycle as set forth in claim 1, wherein the container in the position of use is arranged partially or entirely above the lower end of the fuel tank.

18. The motorcycle as set forth in claim 1, wherein the container in the position of use in the lateral direction is arranged partially or entirely behind a notional vertical plane at the front end of the fuel tank.

19. A motorcycle including:
an internal combustion engine,
a frame,
a fuel tank for carrying a fuel to be consumed by the internal combustion engine, and
a container connected to the internal combustion engine and the fuel tank, wherein the container is configured to store fuel evaporating from the fuel tank,
wherein the container in a position of use is at least partially covered by the fuel tank, and the fuel tank is supported pivotably relative to the frame between a maintenance position and the position of use, and
wherein the pivotable mounting of the fuel tank is provided in a first half of the fuel tank, and the container is fixed to the fuel tank on a second half of the fuel tank.

20. A motorcycle including:
an internal combustion engine,
a frame,
a fuel tank for carrying a fuel to be consumed by the internal combustion engine, and
a container connected to the internal combustion engine and the fuel tank, wherein the container is configured to store fuel evaporating from the fuel tank,
wherein the container in a position of use is at least partially covered by the fuel tank, and the fuel tank is supported pivotably relative to the frame between a maintenance position and the position of use, and
wherein the pivotable mounting of the fuel tank is provided at a first end region of the fuel tank, and the container is fixed to the fuel tank at a second end region of the fuel tank opposite to the first end region.

21. A motorcycle including:
an internal combustion engine,
a frame,
a fuel tank for carrying a fuel to be consumed by the internal combustion engine, and
a container connected to the internal combustion engine and the fuel tank, wherein the container is configured to store fuel evaporating from the fuel tank,
wherein the container in a position of use is at least partially covered by the fuel tank, and the fuel tank is supported pivotably relative to the frame between a maintenance position and the position of use,
wherein the fuel tank is connected to the container by a feed line, and the container is fixed to the fuel tank at a position of the fuel tank relative to the feed line such that, upon a pivotal movement of the fuel tank into the maintenance position, a feed flow of liquid fuel into the container is prevented.

22. A motorcycle including:
an internal combustion engine,
a frame,
a fuel tank for carrying a fuel to be consumed by the internal combustion engine, and
a container connected to the internal combustion engine and the fuel tank, wherein the container is configured to store fuel evaporating from the fuel tank,
wherein the container in a position of use is at least partially covered by the fuel tank, and the fuel tank is supported pivotably relative to the frame between a maintenance position and the position of use,
wherein the container is fixed to the fuel tank by a metallic clip or an elastic fixing member or a metallic clip and an elastic fixing member.

* * * * *